(12) United States Patent
Fujii (10) Patent No.: US 12,173,847 B2
(45) Date of Patent: Dec. 24, 2024

(54) HIGH-PRESSURE GAS TANK MODULE

(71) Applicant: TOYOTA JIDOSHA KABUSHIKI KAISHA, Toyota (JP)

(72) Inventor: Manabu Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 17/933,518

(22) Filed: Sep. 20, 2022

(65) Prior Publication Data

US 2023/0091329 A1    Mar. 23, 2023

(30) Foreign Application Priority Data

Sep. 21, 2021   (JP) .................................. 2021-153104

(51) Int. Cl.
   *F17C 1/16*   (2006.01)
(52) U.S. Cl.
   CPC ........ *F17C 1/16* (2013.01); *F17C 2201/0109* (2013.01); *F17C 2203/066* (2013.01); *F17C 2205/0305* (2013.01)
(58) Field of Classification Search
   CPC ................ F17C 1/16; F17C 2201/0109; F17C 2203/066; F17C 2205/0305
   USPC ............................. 220/203.23, 589, 590, 592
   See application file for complete search history.

(56) References Cited

U.S. PATENT DOCUMENTS

| | | | | |
|---|---|---|---|---|
| 2,376,351 A * | 5/1945 | Gay | ........................ | B23K 5/006 220/586 |
| 8,231,028 B2 * | 7/2012 | Matsuoka | ................. | F16J 13/12 220/582 |
| 2002/0088806 A1 * | 7/2002 | Takaku | ..................... | F17C 1/16 220/589 |
| 2004/0026437 A1 * | 2/2004 | Hembert | ................ | F17C 13/123 220/630 |
| 2009/0255940 A1 * | 10/2009 | Murate | ...................... | F17C 1/16 220/661 |
| 2015/0001229 A1 * | 1/2015 | Helmig | ................... | B29C 49/04 264/515 |
| 2018/0266632 A1 * | 9/2018 | Ogiwara | ................... | F17C 1/06 |

(Continued)

FOREIGN PATENT DOCUMENTS

| | | | | |
|---|---|---|---|---|
| DE | 102021107165 A1 * | 9/2022 | ................. | F17C 1/16 |
| FR | 2923575 A1 * | 5/2009 | ........... | B29C 53/602 |

(Continued)

*Primary Examiner* — J. Gregory Pickett
*Assistant Examiner* — Niki M Eloshway
(74) *Attorney, Agent, or Firm* — Hunton Andrews Kurth LLP (57) ABSTRACT

A high-pressure gas tank module may include: a gas tank which stores high-pressure gas, the tank including a cylindrical side wall extending along a center axis of the tank, and an end wall located at an end of the side wall, wherein the end wall is curved outward in a dome-shape; a protector fixed on an outer surface of the end wall; and a boss located on the center axis and fixed on an inner surface of the end wall. The boss includes a joining surface joined to the inner surface, the protector includes a facing surface facing the end wall, wherein the facing surface includes a joining area joined to the outer surface and a non-joining area extending along the outer surface from the joining area toward the side wall, and the joining area faces the joining surface with the end wall interposed therebetween.

10 Claims, 5 Drawing Sheets

(56) References Cited

U.S. PATENT DOCUMENTS

2019/0203883 A1\* 7/2019 Kojima .................... F17C 1/02
2022/0307648 A1\* 9/2022 Tatsushima ............... F17C 1/06

FOREIGN PATENT DOCUMENTS

| JP | 2002542443 A | 12/2002 | | |
|----|--------------|---------|----|----------|
| JP | 2009108971 A | 5/2009 | | |
| JP | 2014185714 A | \* 10/2014 | | |
| JP | 2017198319 A | 11/2017 | | |
| JP | 2019120263 A | 7/2019 | | |
| JP | 2020008148 A | 1/2020 | | |
| WO | WO-2015197375 A1 | \* 12/2015 | ................ | F17C 1/16 |

\* cited by examiner

HIGH-PRESSURE GAS TANK MODULE

CROSS-REFERENCE TO RELATED APPLICATION

This application claims priority to Japanese patent application No. 2021-153104, filed on Sep. 21, 2021, the entire contents of which are incorporated herein by reference.

TECHNICAL FIELD

The art disclosed herein relates to a high-pressure gas tank module. In particular, it relates to a high-pressure gas tank module comprising a gas tank having an end wall located at one end in a longitudinal direction of the gas tank and a protector fixed to an outer surface of the end wall.

BACKGROUND

A gas tank has a substantially columnar shape, and its end wall is curved outward in a dome shape (as if it were inflated). Due to this, if the gas tank falls to the ground, an outer surface of the end wall is likely to collide with the ground. A high-pressure gas tank module described in Japanese Patent Application Publication No. 2019-120263 suppresses a gas tank from being damaged when the gas tank falls to the ground, by having a protector adhered to an outer surface of an end wall of the gas tank.

SUMMARY

An internal pressure of a gas tank changes in response to filling or discharge of high-pressure gas, and the gas tank accordingly deforms. When its end wall deforms in response to the change in internal pressure, stress acting to detach an outer surface of the end wall from a protector from is applied on a joined area between the outer surface of the end wall and the protector. Especially, there is a problem that relatively large stress acts in several directions on an end wall which is curved in a dome shape (that is, hemispherical shape), by which the protector is prone to detach from the end wall. The present disclosure provides art configured to suppress detachment of an end wall of a gas tank and a protector mounted to the end wall from each other.

A high-pressure gas tank module disclosed herein may comprise: a gas tank, a protector, and a boss. The gas tank is configured to store high-pressure gas, the gas tank comprising a cylindrical side wall extending along a center axis of the gas tank, and an end wall located at an end of the cylindrical side wall, wherein the end wall is curved outward in a dome-shape. The protector is fixed on an outer surface of the end wall of the gas tank. The boss is located on the center axis and fixed on an inner surface of the end wall of the gas tank. The boss comprises a joining surface joined to the inner surface of the end wall. The protector comprises a facing surface facing the end wall, wherein the facing surface includes a joining area joined to the outer surface of the end wall and a non-joining area extending along the outer surface from the joining area toward the side wall. The joining area of the protector faces the joining surface of the boss with the end wall interposed between the joining area and the joining surface.

In the above-mentioned configuration, the boss is joined from inside to the end wall of the gas tank. A range where the boss is joined is reinforced by the boss, and thus the end wall within that range is suppressed from being deformed even when an internal pressure changes. On the other hand, the protector comprises the facing surface facing the end wall of the gas tank and including the joining area joined to the end wall and the non-joining area not joined to the end wall, and the joining area faces the boss (specifically, the joining surface of the boss). That is, the protector is joined within the range oldie end wall of the gas tank that is reinforced by the boss. According to such a configuration, even when a size of the boss is relatively small, detachment of the protector from the gas tank can effectively be reduced without decreasing a size of the protector.

Details and further developments of the art disclosed herein will be described in "Detailed Description" below.

DETAILED DESCRIPTION

In an aspect of the art disclosed herein, the boss may comprise: a metal end cap and a flange integrated with the metal end cap. In this case, the metal end cap may comprise a through hole extending along the center axis and connecting outside and inside of the gas tank. The flange may spread from the through hole along the inner surface of the end wall. The flange may constitute the joining surface. Alternatively, in another aspect, the boss may not comprise the metal end cap.

In the above aspect, the end wall may comprise a communication hole through which the metal end cap passes. In that case, a length of an arc along the end wall from a first point to a second point may be equal to or longer than a length of an arc along the end wall from the second point to a third point when the first point, the second point and the third point are defined in a cross section of the high-pressure gas tank along a plane including the center axis such that the first point is located on an opening end of the communication hole, the second point is located on an outer peripheral end of the flange and the third point is located on a boundary between the joining area and the non-joining area of the protector. In this case, the second point may be located between the first point and the third point, and the third point may be located between the first point and the second point.

In one aspect of the art disclosed herein, an entirety of the joining area of the protector may face the joining surface with the end wall interposed between the entirety of the joining area and the joining surface. According to such configuration, the protector is joined only to a range of the end wall of the gas tank reinforced by the boss. Accordingly, detachment of the protector from the end wall of the gas tank can effectively be suppressed. Alternatively, in another aspect, a part of the protector may be joined to a range of the gas tank end wall which is not reinforced by the boss. That is, only a part of the joining area of the protector may face the joining surface of the boss with the end wall interposed therebetween.

In one aspect of the art disclosed herein, a boundary between the joining area and the non-joining area may face an outer peripheral end of the joining surface with the end wall interposed between the boundary and the outer peripheral end. According to such configuration, the protector can be joined by a maximum area to the range of the end wall of the gas tank reinforced by the boss.

In one aspect of the art disclosed herein, the gas tank may be constituted of carbon fiber reinforced plastic. In this type of gas tank, since the end wall is prone to deformation due to change in an internal pressure, the present art can effectively be implemented.

In one aspect of the art disclosed herein, the protector may be constituted of rigid plastic. According to such a configuration, the end wall of the gas tank can be protected sufficiently by a relatively light-weight protector. A material which constitutes the protector may not be limited in particular.

In one aspect of the art disclosed herein, the facing surface may comprise a groove extending along a boundary between the joining area and the non-joining area. According to such a configuration, even when the end wall of the gas tank which has been deformed outward interferes with the non-joining area of the protector, the protector deforms at the groove, by which stress generated at the joining area can be suppressed. Due to this, the detachment of the protector from the end wall of the gas tank can effectively be suppressed.

In one aspect of the art disclosed herein, a gap may be present between the non-joining area of the facing surface and the outer surface of the end wall. According to such a configuration, even when the end wall deforms outwardly due to change in internal pressure, the end wall can be suppressed from interfering with the protector. Due to this, the detachment of the protector from the end wall of the gas tank can effectively be suppressed.

First Embodiment

Figure 1:
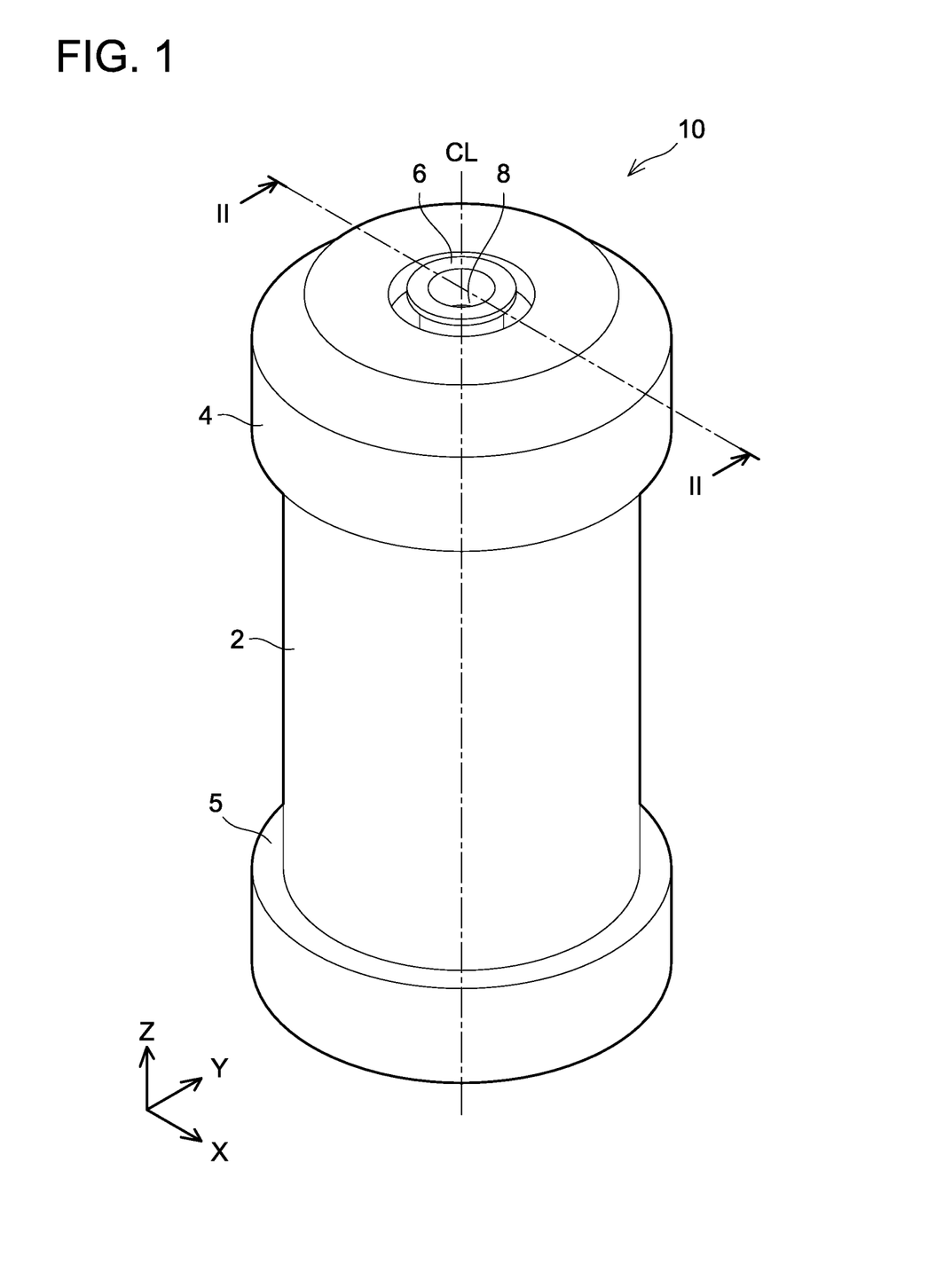
FIG. 1 illustrates a perspective view of a high-pressure gas tank module 10.

With reference to the drawings, a high-pressure gas tank module according to a first embodiment will be described. As shown in FIG. 1, the high-pressure gas tank module 10 of the present embodiment comprises a gas tank 2, a first protector 4, a second protector 5, and a metal end cap 6. The high-pressure gas tank module 10 is configured to be mounted in a fuel cell electric vehicle (not shown), for example. The high-pressure gas tank module 10 is configured to store high-pressure hydrogen gas used for the fuel cell electric vehicle to generate electricity. Hereinbelow, a direction which extends along a central axis CL of the gas tank 2 and is oriented from the second protector 5 toward the first protector 4 (that is, a positive side of a Z axis in the drawings) will be termed "axial direction". Further, an opposite direction therefrom (that is, a negative side of the Z axis in the drawings) will be termed "inverse-axial direction". Further, a direction which perpendicularly intersects the axial direction (that is, on a XY plane in the drawings) and is oriented from the central axis CL toward a surface of the gas tank 2 will be termed "radially outward". A direction oriented from the surface of the gas tank 2 toward the central axis CL will be termed "radially inward".

The gas tank 2 has a columnar shape extending along central axis CL. The gas tank 2 is constituted of carbon fiber reinforced plastic (CFRP). The gas tank 2 comprises a communication hole 8 on an axial direction side. The communication hole 8 is disposed on the central axis CL, and communicates inside and outside of the gas tank 2. Similarly, the metal end cap 6 is disposed on the central axis CL. That is, the metal end cap 6 is concentric with the communication hole 8. The metal end cap 6 penetrates through the communication hole 8 and protrudes to be exposed from the axial direction side of the gas tank 2. The hydrogen gas is filled in the gas tank 2 via the metal end cap 6. The hydrogen gas is discharged out of the gas tank 2 via the metal end cap 6.

The first protector 4 is a protection material covering the gas tank 2 from the axial direction side. The second protector 5 is a protection material covering the gas tank 2 from an inverse-axial direction side. Each of the protectors 4, 5 is constituted of rigid plastic. Here, the rigid plastic is plastic having a compression value higher than soft resin (e.g., polyurethane, ethylene-vinyl acetate (EVA) copolymer). Examples of the rigid plastic include polycarbonate, polyacetal, and acrylonitrile-butadiene-styrene (ABS) resin.

Figure 2:
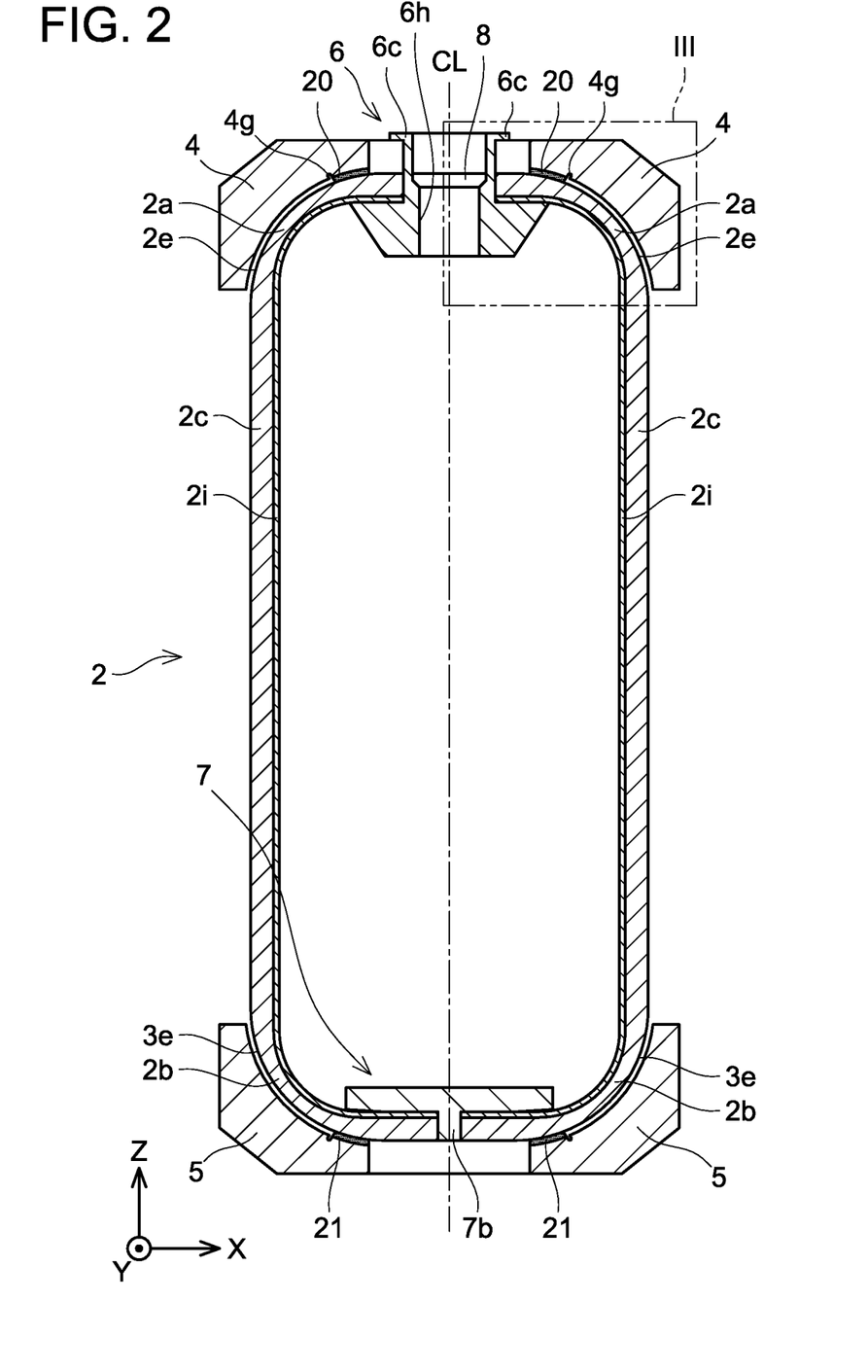
FIG. 2 illustrates a cross-sectional view of FIG. 1 taken along line II-II.

With reference to FIG. 2, a detailed structure of the high-pressure gas tank module 10 will be described. FIG. 2 illustrates a cross section of the high-pressure gas tank module 10 in a plane including the central axis CL. The high-pressure gas tank module 10 has a structure defined by a cross-sectional shape shown in FIG. 2 rotated about the central axis CL. Due to this, the high-pressure gas tank module 10 has a symmetrical shape with the central axis CL at its center.

The gas tank 2 comprises a first end wall 2a, a second end wall 2b, and a side wall 2c. The side wall 2c has a cylindrical shape extending along the central axis CL. The first end wall 2a is located at one end of the side wall 2c on the axial direction side (that is, an upper side in FIG. 2). The first end wall 2a is curved outward (that is, toward the axial direction side) in a dome-shape (as if it were inflated). The communication hole 8 of the first end wall 2a has the metal end cap 6 arranged therethrough. The second end wall 2b is located at the inverse-axial direction side of the side wall 2c (that is, a lower side in FIG. 2). The second end wall 2b has a symmetrical shape with respect to the first end wall 2a. That is, the second end wall 2b is curved outward (that is, toward the inverse-axial direction side) in a dome-shape (as if it were inflated). An end boss 7 is arranged on a radially inside of the second end wall 2b. The metal end cap 6 and the end boss 7 are constituted of metal.

As described above, the gas tank 2 is constituted of the CFRP. In detail, the gas tank 2 is formed by laminating carbon fiber on an outer peripheral surface of a resin liner 2i to which the metal end cap 6 and the end boss 7 have been joined. The carbon fiber is reinforced by being impregnated with resin. Strength of the gas tank 2 can be improved by having the reinforced carbon fiber laminated on the outer peripheral surface of the resin liner 2i. A distal end of the carbon fiber is fixed to a center pin 7b of the end boss 7. The carbon fiber is laminated, starting from the center pin 7b in the axial direction while forming a circular arc about the central axis CL along the outer peripheral surface of the resin liner 2i. Finally, the carbon fiber is wrapped around the metal end cap 6. Due to this, the columnar gas tank 2 is completed. The carbon fiber is laminated while being inclined relative to the axial direction at the respective end walls 2a, 2b, which are curved. Due to this, as shown in FIG. 2, a thickness of the end walls 2a, 2b is thinner than a thickness of the side wall 2c. The end walls 2a, 2b with the thinner thickness are more prone to deformation than the side wall 2c.

If the gas tank 2 falls to the ground, the end walls 2a, 2 are likely to come into contact with the ground. If the end wall(s) 2a, 2b which are prone to deformation contact the ground, shock from collision may cause the gas tank 2 to be damaged. Due to this, the first protector 4 is fixed to a first outer surface 2e of the first end wall 2a by adhesive 20 from the axial direction side (that is, from the upper side in FIG. 2). Similarly, the second protector 5 is fixed to a second outer surface 3e of the second end wall 2b by the adhesive 21 from the inverse-axial direction side (that is, from the lower side in FIG. 2). By the respective end walls 2a, 2b that are prone to deformation being covered by the protectors from outside, the damage to the respective end walls 2a, 2b can be reduced when the gas tank 2 falls to the ground. Here, as described above, each of the protectors 4, 5 is constituted of the rigid plastic. The high-pressure gas tank module 10 can absorb greater energy upon falling to the ground by protecting the respective end walls 2a, 2b with the protectors of the rigid plastic having a high compression value, as compared to a configuration comprising a protector of soft resin.

Figure 3:
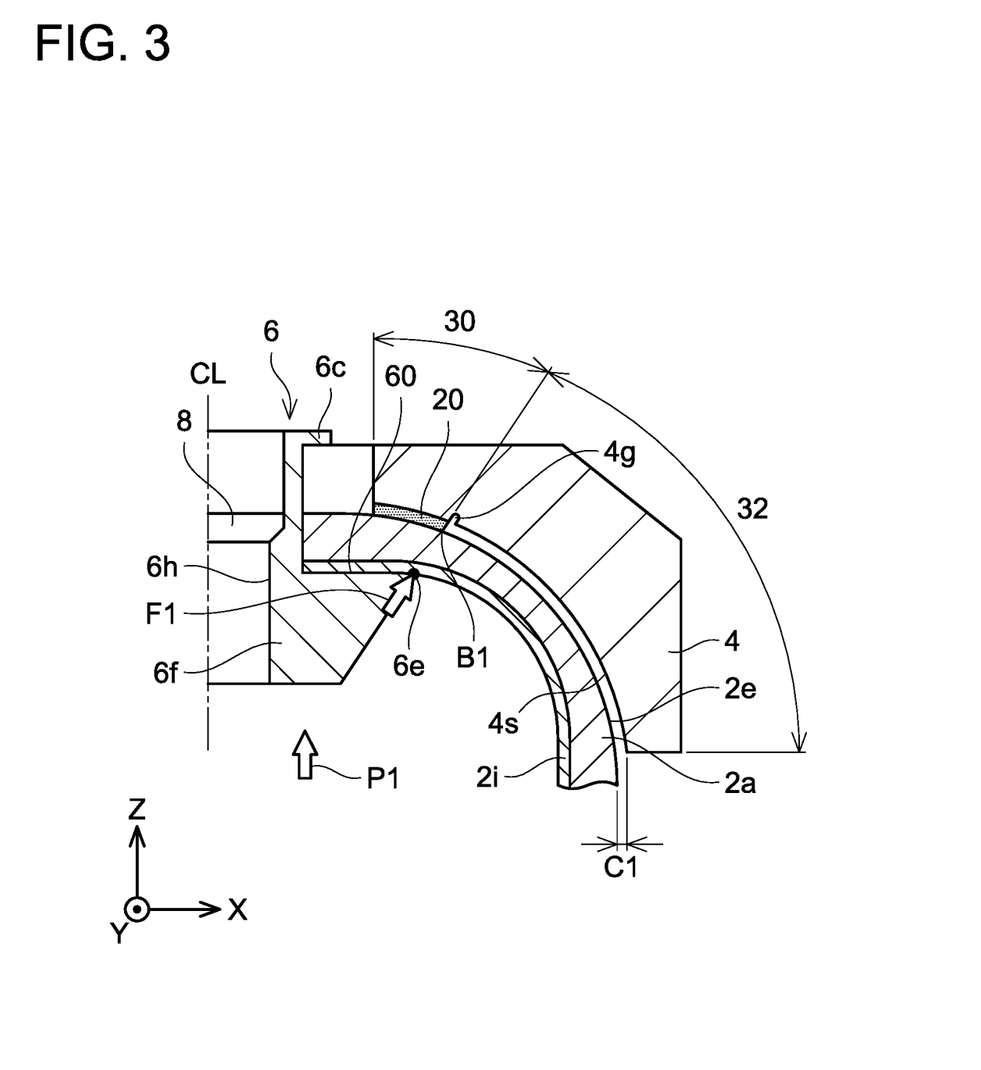
FIG. 3 illustrates an enlarged view of an area enclosed by a dashed line III of FIG. 2.

With reference to FIG. 3, a detailed structure for fixing the first protector 4 to the first outer surface 2e of the first end wall 2a will be described. FIG. 3 illustrates an enlarged view of a range enclosed by a dashed line Ill of FIG. 2. Although the present teachings describe the structure for fixing the first protector 4 to the first outer surface 2e mainly, a structure of fixing the second protector 5 to the second outer surface 3e is the same as that, except for differences in shapes of the metal end cap 6 and the end boss 7. That is, in the present embodiment, each of the metal end cap 6 and the end boss 7 is an example of "boss".

The metal end cap 6 comprises a through hole 6h, a socket 6c, and a flange 6f. The through hole 6h extends along the central axis CL as well as communicates inside and outside of the gas tank 2. A valve (not shown) is fitted through the through hole 6h and the socket 6c. For example, when the hydrogen gas is filled in the gas tank 2, hydrogen gas is filled at high pressure with the valve being open. For example, when a fuel cell (not shown) is charged by using the hydrogen gas within the gas tank 2, the hydrogen gas is supplied to the fuel cell with the valve being open.

The flange 6f of the metal end cap 6 extends from the through hole 6h along an inner surface of the first end wall 2a. The flange 6f comprises a joining surface 60 facing the inner surface of the first end wall 2a. The joining surface 60 is joined to the inner surface of the first end wall 2a. Due to this, the metal end cap 6 reinforces the first end wall 2a from inside thereof. Although not shown, similarly to the metal end cap 6, a flange of the end boss 7 comprises a joining surface joined to an inner surface of the second end wall 2b. Due to this, the end boss 7 reinforces the second end wall 2b from inside thereof.

Figure 5:
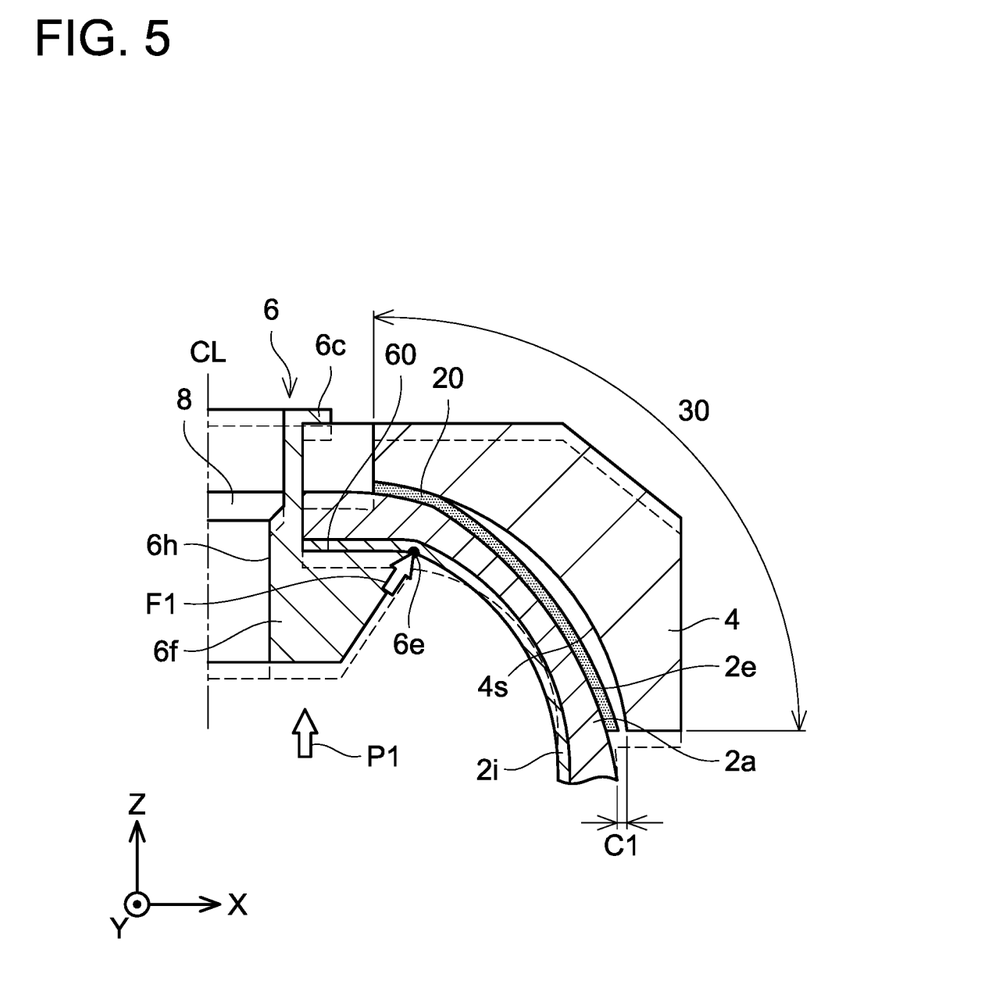
FIG. 5 illustrates an enlarged view of a part corresponding to FIG. 3 in a high-pressure gas tank module according to a conventional art.

Here, with reference to FIG. 5, a shape of a first end wall 2a in a conventional high-pressure gas tank module when it deforms will be described. FIG. 5 is a cross section of the conventional high-pressure gas tank module corresponding to FIG. 3. In FIG. 5, the shape of the high-pressure gas tank module when it deforms is indicated by solid lines, and the shape thereof before it deforms is indicated by broken lines. In the conventional high-pressure gas tank module, in an entire range of a facing surface 4s which faces the first end wall 2a of the first protector 4, the adhesive 20 is disposed between the facing surface 4s and the first outer surface 2e of the first end wall 2a. That is, the entirety of the facing surface 4s is joined to the first outer surface 2e.

For example, when the valve is opened in order to supply the hydrogen gas to the fuel cell, the hydrogen gas stored at high pressure applies internal pressure P1 to the metal end cap 6. The metal end cap 6 pressed by the internal pressure P1 attempts to move in the axial direction (that is, upward in FIG. 5). Due to this, the curved first end wall 2a deforms to extend in the axial direction. Here, in a range where the inner surface of the first end wall 2a and the flange 6a are joined (that is, the range of the joining surface 60), the deformation of the first end wall 2a is restricted by being reinforced by the flange 6f. On the other hand, at a part which is radially outside of the outer peripheral end of the joining surface 60 (that is, right side in FIG. 3), since it is not reinforced by the flange 6f, the deformation of the first end wall 2a is not restricted. Due to this, load F1 pushing the first end wall 2a from inside is applied onto the end of the joining surface 60 on the radially outside (that is, the outer peripheral end 6e of the flange 60. As a result of this, as shown in FIG. 5, the first end wall 2a may abruptly bend from the outer peripheral end 6e as its starting point due to the load F1.

When the first end wall 2a abruptly bends, the first outer surface 2e also abruptly bends. At this occasion, the first outer surface 2e attempts to bend the facing surface 4s of the first protector 4 via the adhesive 20. As mentioned above, since the thickness of the first end wall 2a is locally thin, the first end wall 2a easily deforms. Contrary to this, since the first protector 4 is constituted of the rigid plastic, it has higher rigidity compared to the first end wall 2a. Due to this, when the first outer surface 2e abruptly bends, the first protector 4 preserves its own shape against the bending of the first outer surface 2e. As a result, stress which acts to detach the facing surface 4s of the first protector 4 from the first outer surface 2e is generated between the facing surface 4s of the first protector 4 and the first outer surface 2e. As a result of this, as shown in FIG. 5, in the conventional high-pressure gas tank module, the end of the facing surface 4s of the first protector 4 on the inverse-axial direction side (that is, a lower side of FIG. 5) detaches from the adhesive 20.

As shown in FIG. 3, in the high-pressure gas tank module 10 according to the present embodiment, the facing surface 4s of the first protector 4 comprises a joining area 30 and a non-joining area 32. In the joining area 30, the first outer surface 2e and the facing surface 4s are adhered to each other by the adhesive 20. Further, the joining area 30 faces the joining surface 60 with the first end wall 2a interposed therebetween. Due to this, the first protector 4 is strongly fixed to the part reinforced by the flange 6f among the first outer surface 2e of the first end wall 2a. The non-joining area 32 extends from the joining area 30 toward the side wall 2c along the first outer surface 2e. In the non-joining area 32, the first outer surface 2e and the facing surface 4s are not adhered to each other. That is, unlike the above-mentioned conventional art, in the high-pressure gas tank module 10 according to the present embodiment, the joining of the first protector 4 to the first outer surface 2e of the first end wall 2a is omitted at the part of the facing surface 4s of the first protector 4.

As a result, as described with reference to FIG. 5, even when the first outer surface 2e abruptly bends from the outer peripheral end 6e due to the load F1, at the non-joining area 32, the first outer surface 2e does not cause the first protector 4 to be bent accordingly. Due to this, unlike the above-identified conventional art, the facing surface 4s does not detach from the adhesive 20 at the non-joining area 32. As such, in the high-pressure gas tank module 10 according to the present embodiment, the first protector 4 is joined to the range of the first end wall 2a reinforced by the metal end cap 6, as a result of which the first protector 4 is strongly fixed to the first outer surface 2e. Further, in the high-pressure gas tank module 10, the non-joining area 32 located radially outside of the joining area 30 suppresses the first protector 4 from being deformed when the first end wall 2a deforms. Due to this, without making the size of the first protector 4 small even when a size of the metal end cap 6 is relatively small, the first protector 4 can be suppressed from detaching from the first outer surface 2e when the first end wall 2a deforms.

Further, a boundary B1 between the joining area 30 and the non-joining area 32 faces the outer peripheral end 6e of the flange 6f with the first end wall 2a interposed therebetween. As a result of this, the adhesive 20 does not traverse radially over the outer peripheral end 6e. Due to this, even when the first end wall 2a abruptly bends from the outer peripheral end 6e due to the load F1, the adhesive 20 does not bend. As a result, the adhesive 20 does not easily break. Further, since the non-joining area 32 is not adhered to the first outer surface 2e of the first end wall 2a at the radially outside of the outer peripheral end 6e among the first end wall 2a, the first protector 4 does not follow the bending of the first end wall 2a even when the first end wall 2a abruptly bends from the outer peripheral end 6e of the first end wall 2a due to the load F1. As a result of this, the first protector 4 is suppressed from being deformed at the radially outside of the outer peripheral end 6e of the first end wall 2a which is prone to deformation.

Further, when the first end wall 2a abruptly bends from the outer peripheral end 6e due to the load F1, the first outer surface 2e and the facing surface 4s may sometimes interfere with each other at the non-joining area 32. In this case, in the non-joining area 32, the first protector 4 deforms such that the first protector 4 separates away from the first outer surface 2e. A groove 4g is disposed on the facing surface 4s of the first protector 4. The groove 4g extends along the boundary B1 between the joining area 30 and the non-joining area 32. The groove 4g absorbs the deformation of the first protector 4 at the non-joining area 32. In other words, even when the first outer surface 2e and the facing surface 4s interfere with each other in the non-joining area 32, the first protector 4 deforms at the site of the groove 4g, by which stress generated at the joining area 30 can be reduced. As a result of this, at the joining area 30, the deformation of the first protector 4 can be suppressed. Due to this, the first protector 4 can be suppressed from being detached from the first outer surface 2e.

In the non-joining area 32, a clearance C1 is disposed between the first outer surface 2e and the facing surface 4s. Due to this, when the first end wall 2a abruptly bends from the outer peripheral end 6e due to the load F1, the first outer surface 2e and the facing surface 4s do not interfere with each other easily in the non-joining area 32. As a result, the deformation of the first protector 4 is suppressed at the non-joining area 32.

Second Embodiment

Figure 4:
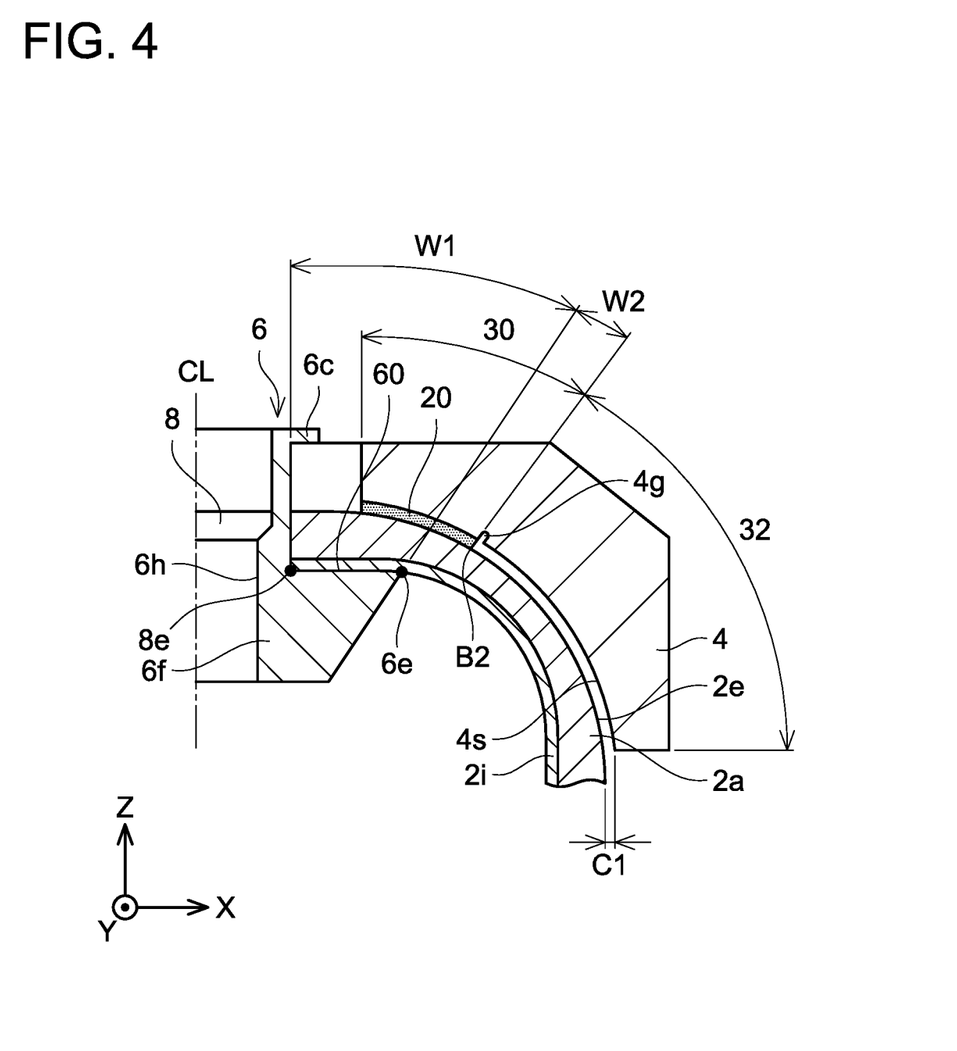
FIG. 4 illustrates an enlarged view of a part corresponding to FIG. 3 in a high-pressure gas tank module 10 according to a second embodiment.

With reference to FIG. 4, a detailed structure of a high-pressure gas tank module 10 according to a second embodiment will be described. Although the high-pressure gas tank module 10 of the second embodiment is different from the high-pressure gas tank module 10 of the first embodiment about a range where an adhesive 20 is arranged, they are the same regarding other structures. In the high-pressure gas tank module 10 of the second embodiment, the adhesive 20 extends radially outward beyond the outer peripheral end 6e of the flange 6f. Due to this, a boundary B2 between the joining area 30 and the non-joining area 32 is more on the radially outside than the outer peripheral end 6e is.

Here, as shown in FIG. 4, an arc length W1 along the first end wall 2a from an opening end 8e of the communication hole 8 to the outer peripheral end 6e of the flange 6f is longer than an arc length W2 from the outer peripheral end 6e to the boundary B2. The flange 6f not only reinforces the joining surface 60 but also reinforces a part of the first end wall 2a located around the flange 6f. In other words, the joining surface 60 of the flange 6f also reinforces the first end wall 2a located radially outside of the outer peripheral end 6e. By positioning the boundary B2 within the range of the arc length W1 from the outer peripheral end 6e of the flange 6f, the first protector 4 is adhered to the part at which deformation is suppressed by the reinforcement of the flange 6f. As a result of this, the first protector 4 can be suppressed from being detached from the first outer surface 2e when the first end wall 2a deforms. In the present embodiment, the opening end 8e is an example of "first point", the outer peripheral end 6e is an example of "second point", and the boundary B2 is an example of "third point".

While specific examples of the present disclosure have been described above in detail, these examples are merely illustrative and place no limitation on the scope of the patent claims. The technology described in the patent claims also encompasses various changes and modifications to the specific examples described above. Some of variants of the above embodiments will be listed as below.

(Variant 1)

A method of fixing the first protector 4 and the second protector 5 to the gas tank 2 is not limited to adhesion. For example, each protector 4, 5 may be joined to the respective end wall 2a, 2b by welding.

(Variant 2)

The first protector 4 and the second protector 5 may each have a structure which is divided into plural parts. For example, the first protector 4 may be composed of protectors divided into four in a circumferential direction of the gas tank 2 as seen along a direction orthogonal to the central axis CL. The divided protectors may be disposed at equal intervals in the circumferential direction.

(Variant 3)

The first protector 4 may be disposed on at least one of head portions. i.e., a head portion of the first end wall 2a at which the metal end cap 6 of the gas tank 2 is arranged and a head portion of the second end wall 2b at which the end boss 7 is arranged.

(Variant 4)

In the high-pressure gas tank module 10 of the second embodiment, the boundary B1 may be located between the opening end Se and the outer peripheral end 6e. As a result, an entirety of the joining area 30 faces the joining surface 60 with the first end wall 2a interposed therebetween. Due to this, the first protector 4 is joined only to the part reinforced by the flange 6f of the metal end cap 6 among the first end wall 2a. Accordingly, the detachment of the first protector 4 from the first end wall 2a of the gas tank 2 can effectively be suppressed.

(Variant 5)

The gas tank 2 may not be constituted of carbon fiber reinforced plastics. In that case, the gas tank 2 may comprise glass fiber reinforced plastic, for example.

(Variant 6)

The first protector 4 may not be constituted of rigid plastic. In that case, the first protector 4 may be constituted of soft resin, for example.

(Variant 7)

The first protector 4 may not comprise the groove 4g on the facing surface 4s.

(Variant 8)

In the non-joining area 32, the clearance C1 may not be disposed between the first outer surface 2e and the facing surface 4s. In the non-joining area 32, the first outer surface 2e and the facing surface 4s may be in contact at least partially with each other.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A high-pressure gas tank module comprising:
   a gas tank configured to store high-pressure gas, the gas tank comprising a cylindrical side wall extending along a center axis of the gas tank, and an end wall located at an end of the cylindrical side wall, wherein the end wall is curved outward in a dome-shape;
   a protector fixed on an outer surface of the end wall of the gas tank; and
   a boss located on the center axis and fixed on an inner surface of the end wall of the gas tank,
   wherein
   the boss comprises a joining surface joined to the inner surface of the end wall,
   the protector comprises a facing surface facing the end wall, wherein the facing surface includes a joining area joined to the outer surface of the end wall and a non-joining area not joined to the outer surface of the end wall, the joining area is located along an inner peripheral end of the facing surface, and the non-joining area extends along the outer surface from an outer peripheral end of the joining area to an outer peripheral end of the facing surface,
   the joining area of the protector faces the joining surface of the boss with the end wall interposed between the joining area and the joining surface, and
   any part of the protector is not joined to the outer surface of the end wall in a region located radially outside a boundary between the joining area and the non-joining area.

2. The high-pressure gas tank module according to claim 1, wherein
   the boss comprises:
   a metal end cap comprising a through hole extending along the center axis and connecting outside and inside of the gas tank; and
   a flange integrated with the metal end cap and spreading from the through hole along the inner surface of the end wall, and
   the flange constitutes the joining surface.

3. The high-pressure gas tank module according to claim 2, wherein
   the end wall comprises a communication hole through which the metal end cap passes, and
   a length of an arc along the end wall from a first point to a second point is equal to or longer than a length of an arc along the end wall from the second point to a third point when the first point, the second point and the third point are defined in a cross section of the high-pressure gas tank along a plane including the center axis such that the first point is located on an opening end of the communication hole, the second point is located on an outer peripheral end of the flange and the third point is located on a boundary between the joining area and the non-joining area of the protector.

4. The high-pressure gas tank module according to claim 1, wherein
   an entirety of the joining area faces the joining surface with the end wall interposed between the entirety of the joining area and the joining surface.

5. The high-pressure gas tank module according to claim 1, wherein
   a boundary between the joining area and the non-joining area faces an outer peripheral end of the joining surface with the end wall interposed between the boundary and the outer peripheral end.

6. The high-pressure gas tank module according to claim 1, wherein
   the gas tank is constituted of carbon fiber reinforced plastic.

7. The high-pressure gas tank module according to claim 1, wherein
   the protector is constituted of rigid plastic.

8. The high-pressure gas tank module according to claim 1, wherein
   the facing surface comprises a groove extending along a boundary between the joining area and the non-joining area.

9. The high-pressure gas tank module according to claim 1, wherein
   a gap is present between the non-joining area of the facing surface and the outer surface of the end wall.

10. The high-pressure gas tank module according to claim 1, wherein
    the facing surface comprises a groove extending along the boundary between the joining area and the non-joining area, wherein,
    the groove is located between the joining area and the non-joining area.

* * * * *